(12) United States Patent
Berger

(10) Patent No.: US 8,806,625 B1
(45) Date of Patent: Aug. 12, 2014

(54) SYSTEMS AND METHODS FOR PERFORMING SECURITY SCANS

(71) Applicant: Henry Berger, Sudbury, MA (US)

(72) Inventor: Henry Berger, Sudbury, MA (US)

(73) Assignee: Symantec Corporation, Mountain View, CA (US)

( * ) Notice: Subject to any disclaimer, the term of this patent is extended or adjusted under 35 U.S.C. 154(b) by 25 days.

(21) Appl. No.: 13/633,867

(22) Filed: Oct. 2, 2012

(51) Int. Cl.
*G06F 11/00* (2006.01)

(52) U.S. Cl.
USPC ............ 726/22; 726/13; 726/24; 726/25; 713/154; 713/186; 713/193; 711/118

(58) Field of Classification Search
CPC ........ H04L 9/3223; H04L 9/06; G06F 21/566
USPC .............. 726/22, 25, 13, 24; 713/154, 186; 711/216
See application file for complete search history.

(56) References Cited

U.S. PATENT DOCUMENTS

| | | | | |
|---|---|---|---|---|
| 5,694,569 | A * | 12/1997 | Fischer | 711/216 |
| 7,797,748 | B2 * | 9/2010 | Zheng et al. | 726/24 |
| 7,865,740 | B2 * | 1/2011 | Rudelic et al. | 713/193 |
| 8,103,764 | B2 * | 1/2012 | Aviles | 709/224 |
| 8,279,479 | B2 * | 10/2012 | Dowling et al. | 358/1.15 |
| 8,458,479 | B2 * | 6/2013 | Takashima | 713/176 |
| 2005/0060535 | A1 * | 3/2005 | Bartas | 713/154 |
| 2005/0240999 | A1 * | 10/2005 | Rubin et al. | 726/22 |
| 2008/0201592 | A1 * | 8/2008 | Lawrence et al. | 713/323 |
| 2008/0216174 | A1 * | 9/2008 | Vogel et al. | 726/22 |
| 2008/0320594 | A1 * | 12/2008 | Jiang | 726/24 |
| 2009/0019547 | A1 * | 1/2009 | Palliyil et al. | 726/25 |
| 2009/0031139 | A1 * | 1/2009 | Geoffrey | 713/186 |
| 2009/0282483 | A1 * | 11/2009 | Bennett | 726/23 |
| 2010/0095064 | A1 * | 4/2010 | Aviles | 711/118 |
| 2011/0302648 | A1 * | 12/2011 | Yoo | 726/13 |
| 2012/0255013 | A1 * | 10/2012 | Sallam | 726/24 |
| 2013/0024935 | A1 * | 1/2013 | Kolingivadi et al. | 726/22 |
| 2013/0312098 | A1 * | 11/2013 | Kapoor et al. | 726/24 |

OTHER PUBLICATIONS

James Meyer, Systems and Methods for Sharing the Results of Computing Operations Among Related Computing Systems, U.S. Appl. No. 12/696,970, filed Jan. 29, 2010.
Mark Kennedy, Systems and Methods for Contextual Evaluation of Files for Use in File Restoration; U.S. Appl. No. 12/882,497, filed Sep. 15, 2010.
Corrado Leita et al., Systems and Methods for Performing Internet Site Security Analyses, U.S. Appl. No. 13/177,891, filed Jul. 7, 2011.
Shreyans Mehta et al., Systems and Methods for Identifying Security Risks in Downloads, U.S. Appl. No. 13/326,995, filed Dec. 15, 2011.

* cited by examiner

*Primary Examiner* — Cordelia Zecher
*Assistant Examiner* — Viral Lakhia
(74) *Attorney, Agent, or Firm* — ALG Intellectual Property, LLC

(57) ABSTRACT

A computer-implemented method for performing security scans may include 1) generating a first hash of a first file, 2) performing a first security scan on the first file, 3) storing the first hash to indicate a result of the first security scan of the first file, 4) identifying a second file and generating a second hash of the second file, 5) determining that the second hash of the second file is equivalent to the first hash of the first file and, in response, determining that the result of the first security scan of the first file applies to the second file, 6) identifying a third file and determining that the third file is volatile, and 7) performing a second security scan on the third file instead of generating a third hash of the third file. Various other methods, systems, and computer-readable media are also disclosed.

17 Claims, 7 Drawing Sheets

SYSTEMS AND METHODS FOR PERFORMING SECURITY SCANS

BACKGROUND

Related computing systems, such as virtual machines running on a common host machine or physical computing devices connected to a common network, may often encounter instances of the same file or files. For example, a high percentage of files within virtual machines that run the same operating system and/or originate from the same base image may be identical. Because of this, related computing systems may redundantly perform identical or similar resource-consuming computing operations (such as security scans) on instances of the same file.

In order to avoid wasting time and/or computing resources on potentially redundant security scans, some traditional security systems may generate and store hashes of scanned files. These traditional security systems may later generate hashes of files that are yet to be scanned and compare the newly generated hashes of the unscanned files to the stored hashes of the previously scanned files. These traditional security systems may scan unscanned files whose hashes do not match any hashes of previously scanned files while skipping scans of unscanned files whose hashes do match hashes of previously scanned files, thus preventing duplicative scans. Unfortunately, hashing operations may also be time- and resource-intensive operations. In some cases, generating a file hash for a file may be more resource-intensive than performing a security scan for the same file. Accordingly, the instant disclosure identifies and addresses a need for additional and improved systems and methods for performing security scans.

SUMMARY

As will be described in greater detail below, the instant disclosure generally relates to systems and methods for performing security scans by generating hashes of non-volatile files and scanning only files whose hashes do not match hashes of previously scanned files, but scanning volatile files without generating hashes for the volatile files.

In one example, a computer-implemented method for performing security scans may include 1) generating a first hash of a first file within a set of files that are subject to security scanning, 2) performing a first security scan on the first file, 3) storing the first hash to indicate a result of the first security scan of the first file, 4) identifying a second file within the set of files and generating a second hash of the second file, 5) determining that the second hash of the second file is equivalent to the first hash of the first file and, in response, determining that the result of the first security scan of the first file applies to the second file, 6) identifying a third file within the set of files and determining that the third file is volatile and therefore less likely to match another file within the set of files, and 7) performing a second security scan on the third file instead of generating a third hash of the third file in response to determining that the third file is volatile.

In some examples, generating the first hash of the first file may include generating the first hash of the first file in response to identifying a hash cache and determining that no hash for the first file is available within the hash cache. Additionally or alternatively, generating the first hash of the first file may include generating the first hash of the first file in response to determining that the first file is non-volatile.

In some embodiments, the computer-implemented method may also include identifying the set of files stored across a plurality of virtual machines. In one embodiment, the computer-implemented method may also include 1) determining that the third file has not changed over a predetermined period of time, 2) marking the third file as non-volatile, and 3) generating the third hash for the third file based on the third file being marked as non-volatile.

In one example, determining that the third file is volatile may include 1) identifying a prior hash indicator that a prior hash for the third file has previously been generated and 2) identifying a current hash indicator that no valid current hash for the third file is available. In some examples, determining that the third file is volatile may include determining that the third file has changed since a previous security assessment of the third file.

In some examples, the computer-implemented method may also include 1) identifying a digitally-signed file within the set of files and 2) performing a security assessment on the digitally-signed file by verifying a digital signature of the digitally-signed file instead of generating an additional hash for the digitally-signed file or performing an additional security scan on the digitally-signed file.

In one embodiment, a system for implementing the above-described method may include 1) a generation module programmed to generate a first hash of a first file within a set of files that are subject to security scanning, 2) a storing module programmed to (i) perform a first security scan on the first file and (ii) store the first hash to indicate a result of the first security scan of the first file, 3) a determination module programmed to (i) identify a second file within the set of files and generating a second hash of the second file and (ii) determine that the second hash of the second file is equivalent to the first hash of the first file and, in response, determining that the result of the first security scan of the first file applies to the second file, 4) an identification module programmed to identify a third file within the set of files and determining that the third file is volatile and therefore less likely to match another file within the set of files, and 5) a scanning module programmed to perform a second security scan on the third file instead of generating a third hash of the third file in response to determining that the third file is volatile. The system may also include at least one processor configured to execute the generation module, the storing module, the determination module, the identification module, and the scanning module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) generate a first hash of a first file within a set of files that are subject to security scanning, 2) perform a first security scan on the first file, 3) store the first hash to indicate a result of the first security scan of the first file, 4) identify a second file within the set of files and generating a second hash of the second file, 5) determine that the second hash of the second file is equivalent to the first hash of the first file and, in response, determine that the result of the first security scan of the first file applies to the second file, 6) identify a third file within the set of files and determine that the third file is volatile and therefore less likely to match another file within the set of files, and 7) perform a second security scan on the third file instead of generating a third hash of the third file in response to determining that the third file is volatile.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
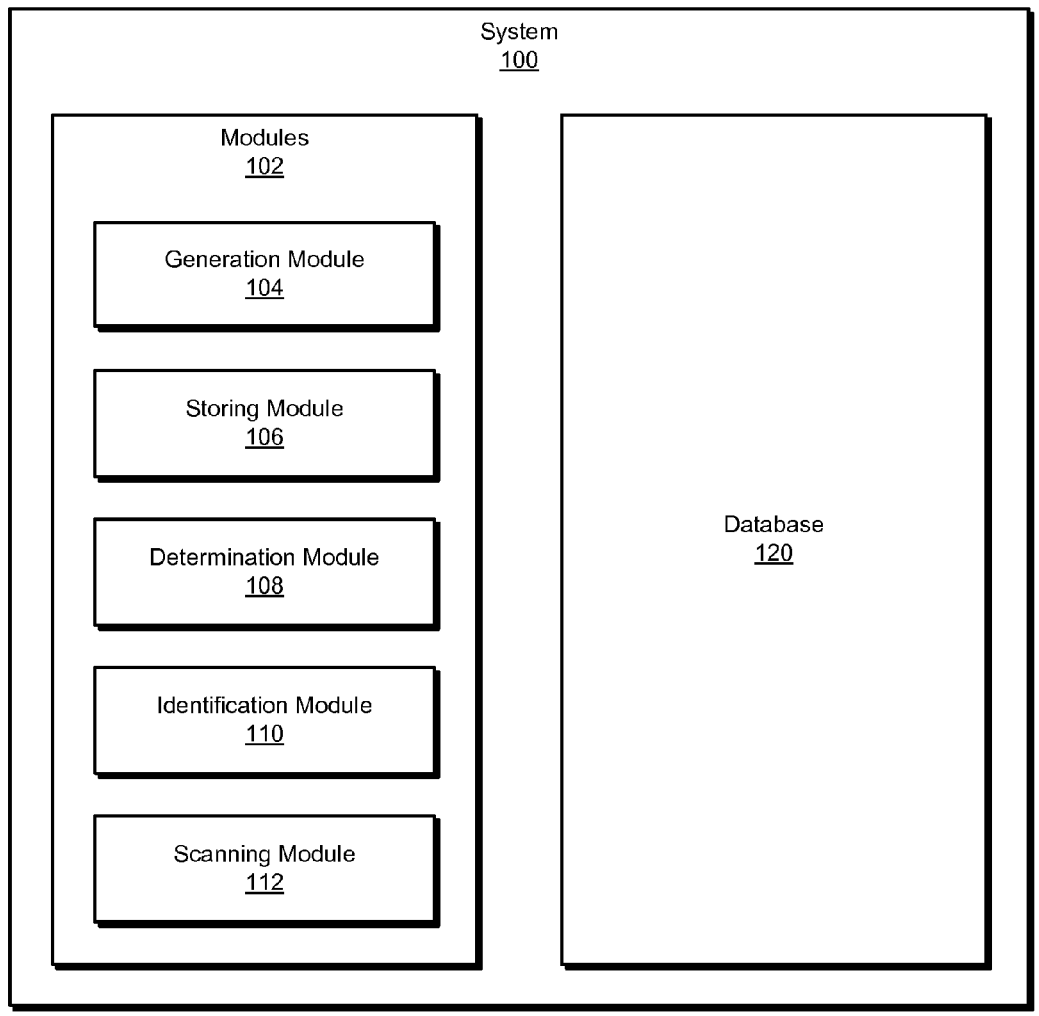
FIG. 1 is a block diagram of an exemplary system for performing security scans.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for performing security scans. As will be explained in greater detail below, by generating hashes of non-volatile files and scanning only files whose hashes do not match hashes of previously scanned files, but scanning volatile files without generating hashes for the volatile files, the systems and methods described herein may avoid redundant scanning operations using hashes while also avoiding generating hashes in resource-inefficient circumstances. For example, by directly scanning volatile files instead of generating hashes for the volatile files, these systems and methods may consume fewer computing resources in the short term (e.g., because generating hashes may consume significant computing resources) without sacrificing resource efficiency in the long term (e.g., because volatile files may change before their hashes could be reused in future scanning operations and/or because volatile files may be significantly less likely to match other files in the first place).

Figure 2:
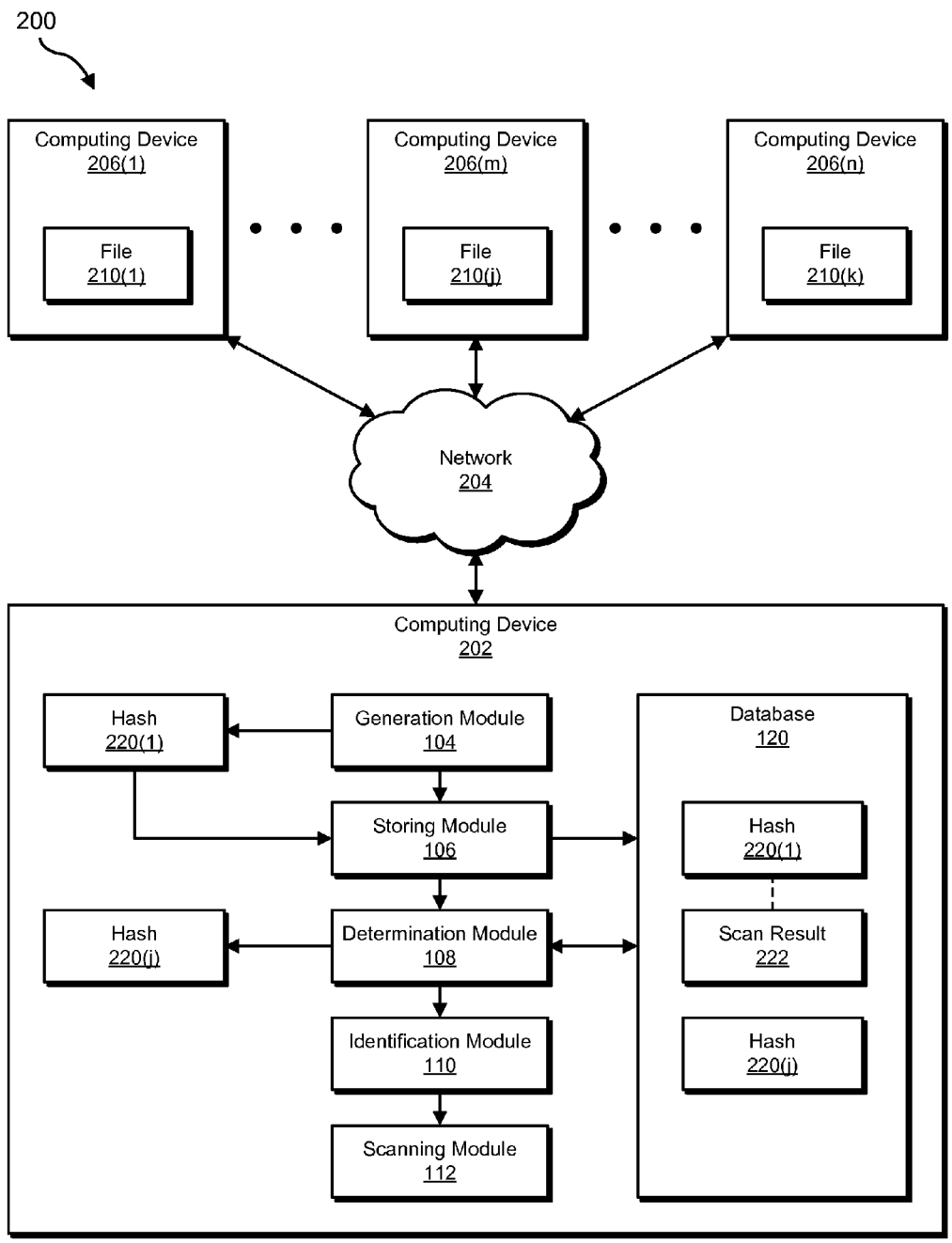
FIG. 2 is a block diagram of an exemplary system for performing security scans.
Figure 3:
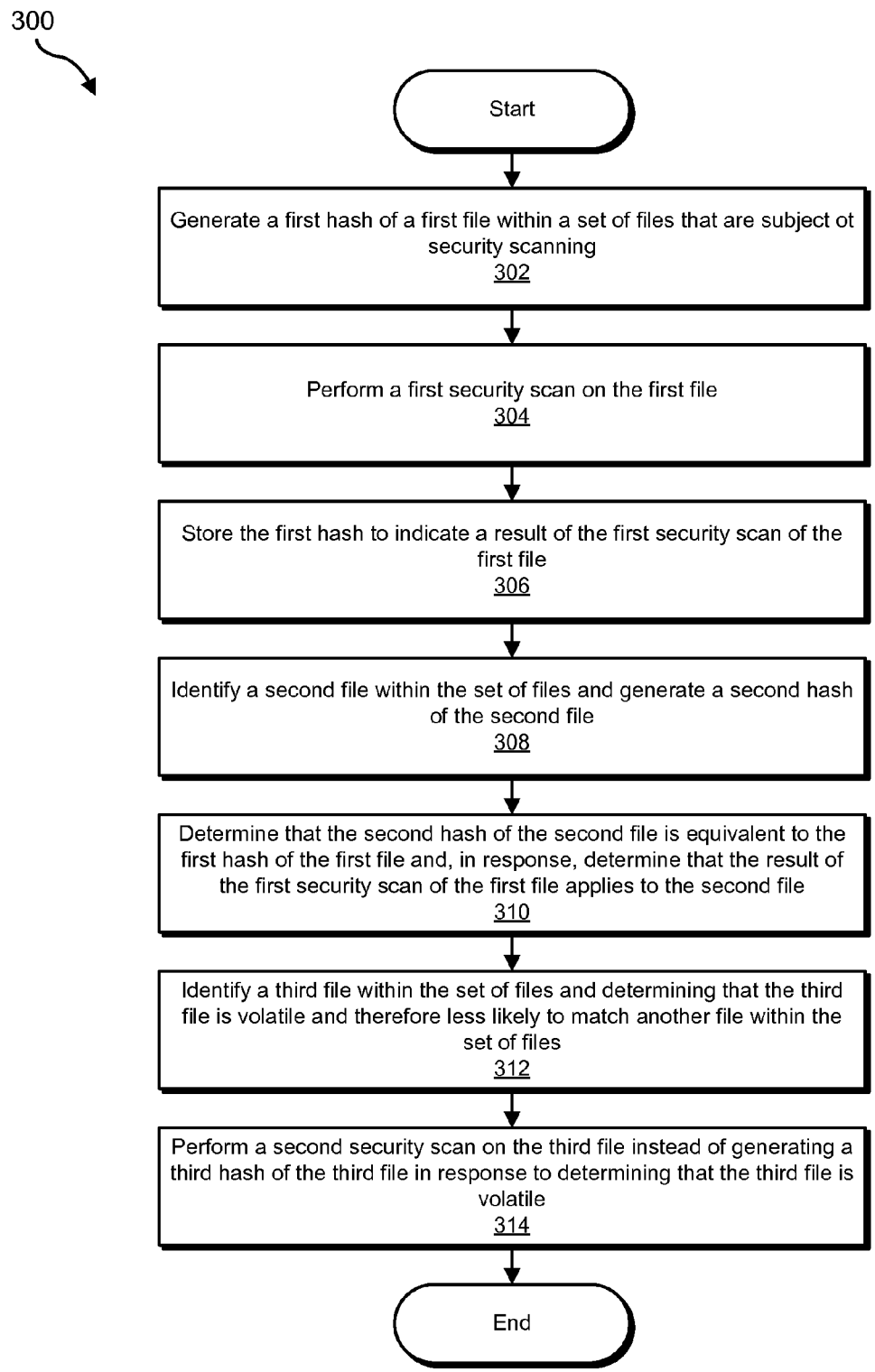
FIG. 3 is a flow diagram of an exemplary method for performing security scans.
Figure 4:
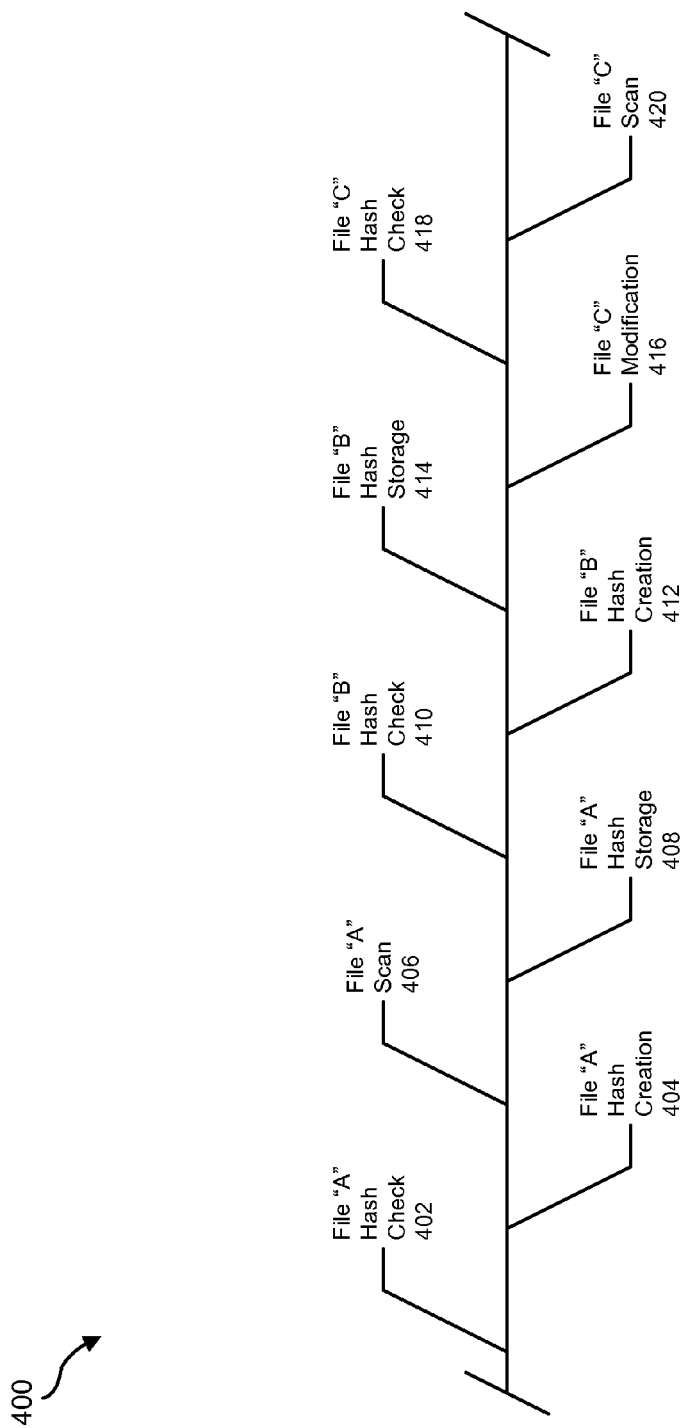
FIG. 4 is an illustration of an exemplary timeline for performing security scans.

The following will provide, with reference to FIGS. 1, 2, and 4, detailed descriptions of exemplary systems for performing security scans. Detailed descriptions of corresponding computer-implemented methods will also be provided in connection with FIG. 3. Detailed descriptions of an exemplary timeline will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for performing security scans. As illustrated in this figure, exemplary system 100 may include one or more modules 102 for performing one or more tasks. For example, and as will be explained in greater detail below, exemplary system 100 may include a generation module 104 programmed to generate a first hash of a first file within a set of files that are subject to security scanning. Exemplary system 100 may also include a storing module 106 programmed to (i) perform a first security scan on the first file and (ii) store the first hash to indicate a result of the first security scan of the first file.

In addition, and as will be described in greater detail below, exemplary system 100 may include a determination module 108 programmed to (i) identify a second file within the set of files and generating a second hash of the second file and (ii) determine that the second hash of the second file is equivalent to the first hash of the first file and, in response, determining that the result of the first security scan of the first file applies to the second file. Exemplary system 100 may also include an identification module 110 programmed to identify a third file within the set of files and determining that the third file is volatile and therefore less likely to match another file within the set of files. Exemplary system 100 may further include a scanning module 112 programmed to perform a second security scan on the third file instead of generating a third hash of the third file in response to determining that the third file is volatile. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or computing devices 206(1)-(n)), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store hashes of files that have been scanned (and, in some examples, information indicating that the files have been scanned and/or results of such scans).

Database 120 may represent portions of a single database or computing device or a plurality of databases or computing devices. For example, database 120 may represent a portion of computing device 202 in FIG. 2, computing devices 206(1)-(n) in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 in FIG. 2, computing devices 206(1)-(n) in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a computing devices 206(1)-(n) via a network 204. Computing device 202 may be programmed with one or more of modules 102 and/or may store all or a portion of the data in database 120. Additionally or alternatively, computing devices 206(1)-(n) may be programmed with one or more of modules 102 and/or may store all or a portion of the data in database 120.

In one embodiment, one or more of modules 102 from FIG. 1 may, when executed by at least one processor of computing device 202 and/or computing devices 206(1)-(n), facilitate computing device 202 and/or computing devices 206(1)-(n) in performing security scans. For example, and as will be described in greater detail below, one or more of modules 102 may cause computing device 202 and/or computing devices 206(1)-(n) to 1) generate a hash 220(1) of a file 210(1) within a set of files 210(1)-(k) that are subject to security scanning, 2) perform a security scan on file 210(1), 3) store hash 220(1) to indicate a scan result 222 of the first security scan of file 210(1), 4) identify a file 210(j) within the set of files 210(1)-(k) and generating a hash 220(j) of file 210(j), 5) determine that hash 220(j) of file 210(j) is equivalent to hash 220(1) of file 210(1) and, in response, determine that scan result 222 of the security scan of file 210(1) applies to file 210(j), 6) identify a file 210(k) within the set of files 210(1)-(k) and determine that file 210(k) is volatile and therefore less likely to match another file within the set of files 210(1)-(k), and 7) perform a security scan on file 210(k) instead of generating a hash of file 210(k) in response to determining that file 210(k) is volatile.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Computing devices 206(1)-(n) generally represent any type or form of computing device that is capable of hosting, storing, and/or accessing files. Examples of computing devices 206(1)-(n) include, without limitation, application servers and database servers configured to provide various database services and/or run certain software applications. In some examples, computing devices 206(1)-(n) may include virtual machines and/or virtual machine hosts.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and computing devices 206(1)-(n).

FIG. 3 is a flow diagram of an exemplary computer-implemented method 300 for performing security scans. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may generate a first hash of a first file within a set of files that are subject to security scanning. For example, at step 302 generation module 104 may, as part of computing device 202 in FIG. 2, generate a hash 220(1) of a file 210(1) within a set of files 210(1)-(k) that are subject to security scanning.

As used herein, the term "hash" may refer to any abbreviated representation of the contents of a file, including the outputs of hash functions, fingerprints, checksums, and/or any other type of file identifiers that uniquely identify file content (barring a collision).

As used herein, the term "file" may refer to any unit of data, including, without limitation, files, data objects, images, packages, databases, and documents. In some examples, the file may include an executable file and/or one or more computer-executable instructions. As used herein, the phrase "security scan" may refer to any suitable security assessment, analysis, and/or scan (e.g., to determine the safety, maliciousness, and/or legitimacy of a file). For example, the security scan may include a malware scan, an intrusion prevention analysis, a scan for potential security exploits, etc. As used herein, the term "malware" may refer to any virus, worm, Trojan horse, spyware, and/or any other malicious, illegitimate, and/or unauthorized software. Additionally or alternatively, a security scan may include a privacy and/or data loss prevention assessment for determining the sensitivity of a file.

In some examples, generation module 104 may also identify the set of files. Generation module 104 may identify the set of files in any suitable context. For example, the set of files may be stored across a group of virtual machines. In some examples, the group of virtual machines may store many instances of identical files. For example, the group of virtual machines may run the same operating system and/or originate from the same base image. Accordingly, in some examples, generation module 104 may identify the set of files stored across a plurality of virtual machines by identifying a plurality of virtual machines that run the same operating system. Additionally or alternatively, generation module 104 may identify the set of files stored across the plurality of virtual machines by identifying a plurality of virtual machines that originate from the same base image. In some examples, generation module 104 may identify the set of files stored across the plurality of virtual machines by reading a configuration file identifying the plurality of virtual machines.

As used herein, the phrase "virtual machine" generally refers to a computing system platform that may not have direct correspondence to hardware of an underlying host system. For example, hardware of a host system may be abstracted to a virtual machine using a hypervisor or other virtualization software. A virtual machine may run a guest operating system and/or various other software applications.

Generation module 104 may generate the first hash of the first file in any suitable context. In some examples, generation module 104 may generate the first hash of the first file in response to identifying a hash cache and determining that no hash for the first file is available within the hash cache. The hash cache may include any suitable database, data store, and/or data structure for storing file hashes.

FIG. 4 illustrates an exemplary timeline 400 for performing security scans. Using FIG. 4 as an example, exemplary timeline 400 may include a file "A" hash check 402. For example, generation module 104 may identify a hash cache and determine that no hash for file "A" is available within the hash cache. A file "A" hash creation 404 may follow file "A" hash check 402. For example, generation module 104 may, having determined that no hash for file "A" is available, generate a hash for file "A."

In some examples, generation module 104 may generate the first hash of the first file in response to determining that the first file is non-volatile. As used herein, the term "non-volatile" may refer to any file that is unlikely to change in the future and/or that has not changed in the past and/or the recent past. Generation module 104 may determine that the first file is non-volatile according to any of a number of criteria. For example, generation module 104 may determine that the first file is non-volatile based on the file type of the file (e.g., generation module 104 may determine that an executable file and/or a static data file is non-volatile). In some examples, generation module 104 may determine that the first file is non-volatile based on determining that the file has not been modified (e.g., since the creation of the file, for a predetermined period of time, etc.). In some examples, generation module 104 may determine that the first file is non-volatile by identifying a configuration file designating the first file as non-volatile. Using FIG. 4 as an example, generation module 104 may determine that file "A" is non-volatile before (e.g., and as a prerequisite to) file "A" hash creation 404. As will be explained in greater detail below, by only generating hashes for non-volatile files, the systems and methods described herein may conserve computing resources.

Figure 5:
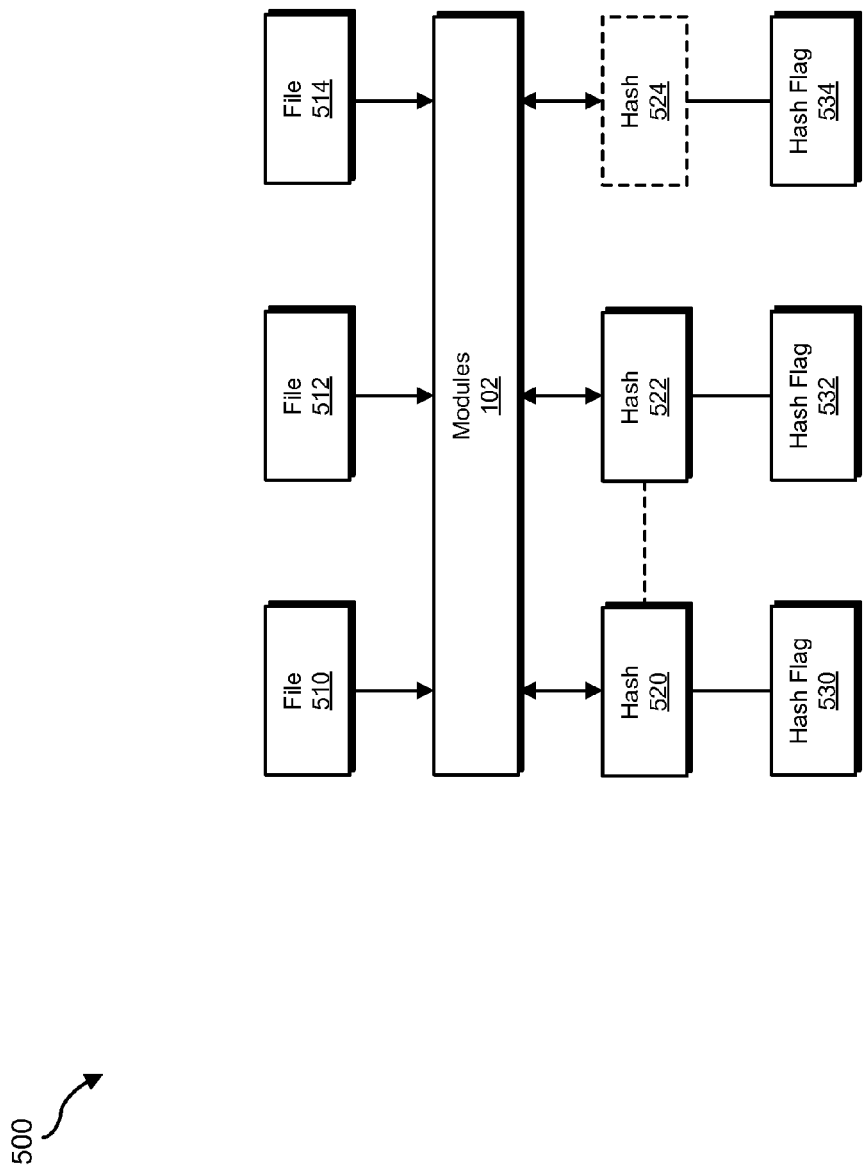
FIG. 5 is a block diagram of an exemplary system for performing security scans.

FIG. 5 illustrates an exemplary system 500 for performing security scans. As shown in FIG. 5, exemplary system 500 may include modules 102. Using FIG. 5 as an example, generation module 104 may, as a part of modules 102, identify a set of files 510, 512, and 514. Generation module 104 may also generate a hash 520 for file 510. In generating hash 520, generation module 104 may also set a hash flag 530, indicating that a hash for file 510 has been created.

Returning to FIG. 3, at step 304 one or more of the systems described herein may perform a first security scan on the first file. For example, at step 304 storing module 106 may, as part of computing device 202 in FIG. 2, perform a security scan on file 210(1).

Storing module 106 may perform the first security scan on the first file in any suitable manner. For example, storing module 106 may parse and/or analyze the first file for one or more fingerprints and/or patterns identifying malware, security vulnerabilities, and/or sensitive data. Additionally or alternatively, storing module 106 may communicate with a security system to initiate and/or retrieve the results of a security scan of the first file.

In some examples, storing module 106 may perform the first security scan on the first file in response to determining that the first hash generated for first file did not match any hash of previously scanned files in the set of files.

Using FIG. 4 as an example, a file "A" scan 406 may follow file "A" hash creation 404. For example, storing module 106 may scan file "A" for malware (e.g., because the hash for file "A" in file "A" hash creation 404 does not match any existing hash of a previously scanned file).

Using FIG. 5 as an example, at step 304 storing module 106 may, as a part of modules 102, perform a security scan on file 510.

Returning to FIG. 3, at step 306 one or more of the systems described herein may store the first hash to indicate a result of the first security scan of the first file. For example, at step 306 storing module 106 may, as part of computing device 202 in FIG. 2, store hash 220(1) to indicate a scan result 222 of the first security scan of file 210(1).

Storing module 106 may store the first hash to indicate the result of the security scan of the first file in any suitable manner. For example, storing module 106 may simply store the first hash in a data structure for clean scanned files, thereby indicating that the first file has been scanned and verified as safe and/or legitimate. Additionally or alternatively, storing module 106 may store the first hash and the result of the first security scan in a data pair, thereby enabling a lookup of the result of the first security scan (e.g., safe, suspicious, malicious, sensitive, etc.) using the first hash.

Using FIG. 4 as an example, a file "A" hash storage 408 may follow file "A" scan 406. For example, storing module 106 may store the hash created in file "A" hash creation 404 to indicate the result of file "A" scan 406.

Using FIG. 5 as an example, storing module 106 may, as a part of modules 102, store hash 520 to indicate the result of scanning file 510.

Returning to FIG. 3, at step 308 one or more of the systems described herein may identify a second file within the set of files and generating a second hash of the second file. For example, at step 308 determination module 108 may, as part of computing device 202 in FIG. 2, identify a file 210(j) within the set of files 210(1)-(k) and generating a hash 220(j) of file 210(j).

Determination module 108 may identify the second file within any suitable context. For example, determination module 108 may determine that the second file is subject to a security assessment. Accordingly, determination module 108 may determine that no hash for the second file has been generated, and then generate the hash for the second file (e.g., having determined that the second file is non-volatile).

Using FIG. 4 as an example, timeline 400 may include a file "B" hash check 410 followed by a file "B" hash creation 412 and a file "B" hash storage. For example, determination module 108 may identify file "B" for a security assessment and check for the existence of a hash for file "B". Determination module 108 may then create a hash for file "B" (e.g., having determined that no hash existed and that file "B" is non-volatile). Determination module 108 may then store the hash for file "B" (e.g., to be available for future security assessments).

Using FIG. 5 as an example, determination module 108 may identify file 512 and generate a hash 522 of file 512. Determination module 108 may also set a hash flag 532 indicating that a hash for file 512 has been generated.

Returning to FIG. 3, at step 310 one or more of the systems described herein may determine that the second hash of the second file is equivalent to the first hash of the first file and, in response, determine that the result of the first security scan of the first file applies to the second file. For example, at step 310 determination module 108 may, as part of computing device 202 in FIG. 2, determine that hash 220(j) of file 210(j) is equivalent to hash 220(1) of file 210(1) and, in response, determine that scan result 222 of the security scan of file 210(1) applies to file 210(j).

Determination module 108 may determine that the second hash of the second file is equivalent to the first hash of the first file in any suitable manner. For example, determination module 108 may query a database storing the first hash of the first file (e.g., previously stored by storing module 106) with the second hash, and receive a hit of the second hash in response. In some examples, simply by identifying the hit, determination module 108 may determine that an identical file has previously been scanned and determined to be clean, safe, and/or non-sensitive. Additionally or alternatively, determination module 108 may receive a representation of the result of the first security scan on the first file in response to the query.

Using FIG. 4 as an example, following file "B" hash storage 414, determination module 108 may determine that the hash of file "A" matches the hash of file "B", and that the results of file "A" scan 406 therefore apply to file "B". Accordingly, timeline 400 may not include a separate scan of file "B".

Using FIG. 5 as an example, determination module 108 may, as a part of modules 102, determine that hash 520 and hash 522 match. Determination module 108 may therefore skip a scan of file 512, instead relying on a result of a past scan of file 510 based on the matching hashes 520 and 522.

Returning to FIG. 3, at step 312 one or more of the systems described herein may identify a third file within the set of files and determine that the third file is volatile and therefore less likely to match another file within the set of files. For example, at step 312 identification module 110 may, as part of computing device 202 in FIG. 2, identify a file 210(k) within the set of files 210(1)-(k) and determine that file 210(k) is volatile and therefore less likely to match another file within the set of files 210(1)-(k).

As used herein, the term "volatile" may refer to any file may and/or is likely to change in the future and/or that has changed in the past and/or recent past. As will be described in greater detail below, the systems and methods described herein may use any of a variety of criteria to judge the volatility of a file.

Identification module 110 may identify the third file in any suitable context. For example, identification module 110 may identify the third file by determining that the third file is subject to a security assessment. In some examples, identification module 110 may identify the third file in response to identifying the creation and/or modification of the third file.

Identification module 110 may determine that the third file is volatile in any of a variety of ways. For example, identification module 110 may identify a prior hash indicator that a prior hash for the third file has previously been generated. Identification module 110 may also identify a current hash indicator that no valid current hash for the third file is available. The prior hash indicator may include any value capable of indicating that a hash has previously been generated for a file (e.g., whether or not the hash is currently available). For example, the prior hash indicator may include a flag that is set when a hash is generated for the file. The current hash indicator may include any value capable of indicating that a valid current hash for a file is available. For example, the current hash indicator may include a placeholder for the current hash for the file (e.g., by setting the hash value for a file to a null value and/or otherwise deleting the hash value for a file, the systems and methods described herein may cause the current hash indicator to indicate that no valid current hash for the file is available). By determining that a hash had previously been generated for the third file but that the hash is no longer valid, identification module 110 may determine that the third file has changed, and is therefore volatile.

Using FIG. 5 as an example, one or more of modules 102 may generate a hash 524 for file 514 and, therefore, set a hash flag 534. One or more of modules 102 may then determine that file 514 has been modified, and may therefore invalidate hash 524 (e.g., by overwriting hash 524 with a null value). Identification module 110 may later identify file 514 as subject to a security assessment. However, identification module 110 may not generate and/or may cause no hash to be generated for file 514 based on determining that a hash was previously created for file 514 (e.g., due to hash flag 534 being set). Instead, as will be described in greater detail below, one or more of the systems described herein may scan file 514 without hashing file 514 again.

In some examples, identification module 110 may determine that the third file is volatile simply by determining that the third file has changed since a previous security assessment of the third file. For example, identification module 110 may identify a modification time of the third file as described within a file system managing the third file. In some examples, identification module 110 may determine that the third file is volatile based at least in part of a file type of the third file (e.g., a log file, a configuration file, a user-facing document such as a word processing document, etc.).

Using FIG. 4 as an example, timeline 400 may include a file "C" modification 416 and a file "C" hash check 418. For example, some time after file "C" is modified, identification module 110 may determine that file "C" is subject to a security assessment and check for a valid hash for file "C". Upon determining that no valid hash exists for file "C", identification module 110 may nevertheless skip a hash creation for file "C" based on determining that file "C" is volatile.

Returning to FIG. 3, at step 314 one or more of the systems described herein may perform a second security scan on the third file instead of generating a third hash of the third file in response to determining that the third file is volatile. For example, at step 314 scanning module 112 may, as part of computing device 202 in FIG. 2, perform a security scan on file 210(k) instead of generating a hash of file 210(k) in response to determining that file 210(k) is volatile.

Scanning module 112 may perform the second security scan instead of generating the third hash in any suitable manner. For example, scanning module 112 may block the generation of the third hash. In some examples, scanning module 112 may skip an instruction that would otherwise generate the third hash.

Using FIG. 4 as an example, timeline 400 may include a file "C" scan. For example, scanning module 112 may scan file "C" without generating a hash for file "C" in response to determining that file "C" is volatile. As shown in FIG. 4, timeline 400 may include no creation of a hash for file "C" (e.g., following file "C" hash check 418 and before file "C" scan 420).

Using FIG. 5 as an example, scanning module 112 may scan file 514 without generating a new hash 524 for file 514 based on determining that file 514 is volatile (e.g., because no current hash 524 exists but hash flag 534 has been set, indicating that hash 524 existed before but was later invalidated by a change to file 514).

In some examples, one or more of the systems described herein may also 1) identify a digitally-signed file within the set of files and 2) perform a security assessment on the digitally-signed file by verifying a digital signature of the digitally-signed file instead of generating an additional hash for the digitally-signed file or performing an additional security scan on the digitally-signed file. By neither generating hashes for nor scanning digitally-signed files, the systems and methods described herein may avoid resource-intensive operations for files that have already been validated as safe.

In some examples, one or more of the systems described herein may determine that a file previously designated as volatile is not volatile. For example, generation module 104 may 1) determine that the third file has not changed over a predetermined period of time, 2) mark the third file as non-volatile (e.g., in response to the determination that the third file has not changed over the predetermined period of time), and 3) generate the third hash for the third file based on the third file being marked as non-volatile. For example, the third file may have been subject to a non-signed update that modified the file but which does not signify that the file is subject to frequent changes and/or that the file is unlikely to match parallel files on other computing systems. Accordingly, by marking the third file as non-volatile, generation module 104 may capture potential resource savings from generating a hash for the third file.

As explained above, by generating hashes of non-volatile files and scanning only files whose hashes do not match hashes of previously scanned files, but scanning volatile files without generating hashes for the volatile files, the systems and methods described herein may avoid redundant scanning operations using hashes while also avoiding generating hashes in resource-inefficient circumstances. For example, by directly scanning volatile files instead of generating hashes for the volatile files, these systems and methods may consume fewer computing resources in the short term (e.g., because generating hashes may consume significant computing resources) without sacrificing resource efficiency in the long term (e.g., because volatile files may change before their hashes could be reused in future scanning operations and/or because volatile files may be significantly less likely to match other files in the first place).

Figure 6:
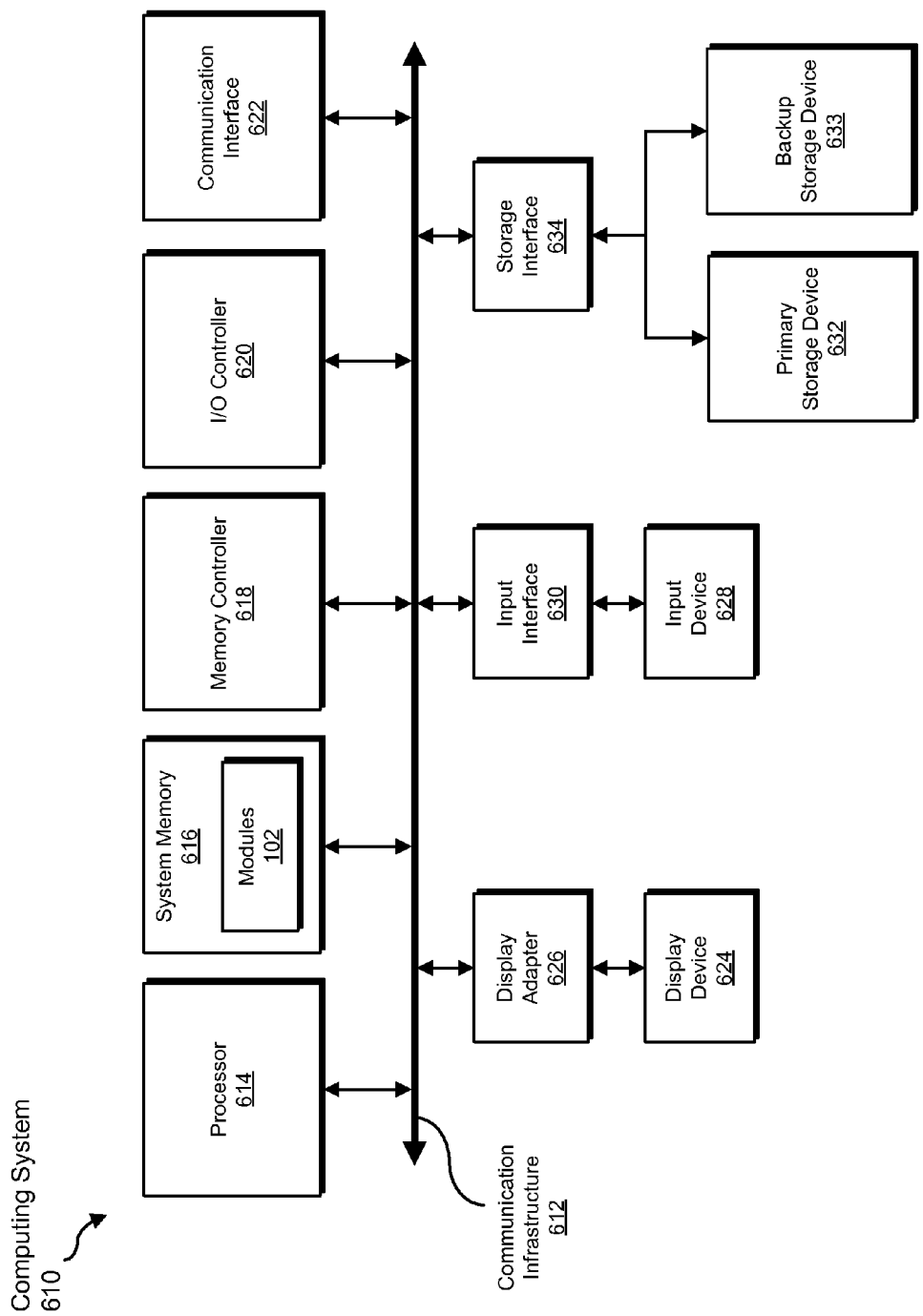
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the generating, identifying, performing, storing, determining, performing, scanning, and marking steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
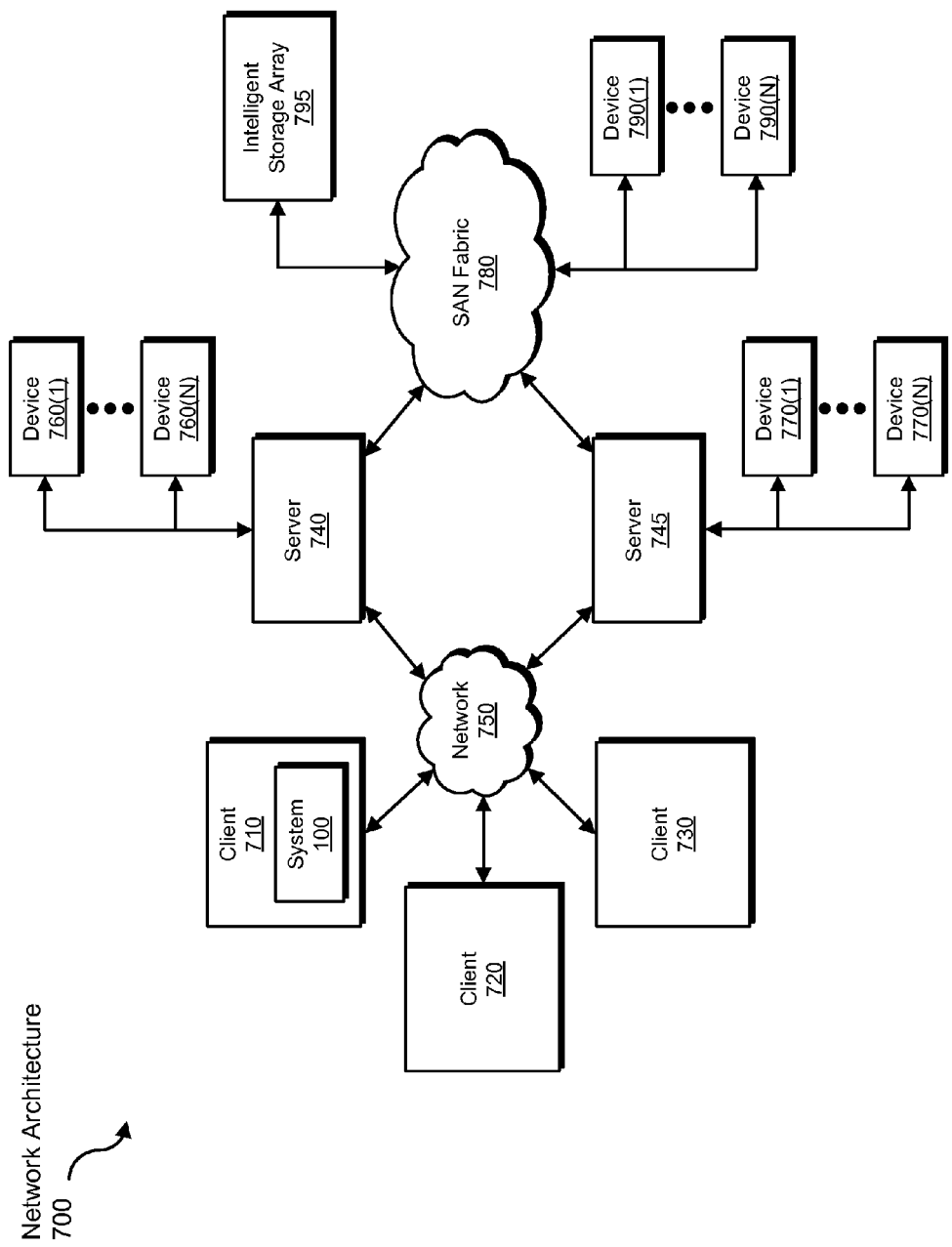
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the generating, identifying, performing, storing, determining, performing, scanning, and marking steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for performing security scans.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a file to be transformed, transform the file, output a result of the transformation, use the result of the transformation to reuse prior security scan results (e.g., for duplicative files across disparate systems, such as virtual machines), and store the result of the transformation to a hash database on a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing security scans, at least a portion of the method being performed by a computing device comprising at least one processor, the method comprising:
   generating a first hash of a first file within a set of files that are subject to security scanning;
   performing a first security scan on the first file;
   storing the first hash to indicate a result of the first security scan of the first file;
   identifying a second file within the set of files and generating a second hash of the second file;
   determining that the second hash of the second file is equivalent to the first hash of the first file and, in response, determining that the result of the first security scan of the first file applies to the second file;
   identifying a third file within the set of files and determining that the third file is volatile and therefore less likely to match another file within the set of files, wherein determining that the third file is volatile comprises:
   identifying a prior hash indicator that indicates that a prior hash for the third file has previously been generated;
   identifying a current hash indicator that indicates that no valid current hash for the third file is available;
   wherein when it is determined that the prior hash indicator indicates that a prior hash has been previously generated and that the current hash indicator indicates that no valid current hash is available, determining that the third file has previously changed;
   performing a second security scan on the third file instead of generating a third hash of the third file in response to determining that the third file is volatile.

2. The computer-implemented method of claim 1, wherein determining that the third file is volatile comprises determining that the third file has changed since a previous security assessment of the third file.

3. The computer-implemented method of claim 1, further comprising identifying the set of files stored across a plurality of virtual machines.

4. The computer-implemented method of claim 1, wherein generating the first hash comprises of the first file comprises generating the first hash of the first file in response to determining that the first file is non-volatile.

5. The computer-implemented method of claim 1, wherein generating the first hash of the first file is in response to identifying a hash cache and determining that no hash for the first file is available within the hash cache.

6. The computer-implemented method of claim 1, further comprising:
   identifying a digitally-signed file within the set of files;
   performing a security assessment on the digitally-signed file by verifying a digital signature of the digitally-signed file instead of generating an additional hash for the digitally-signed file or performing an additional security scan on the digitally-signed file.

7. The computer-implemented method of claim 1, further comprising:
   determining that the third file has not changed over a predetermined period of time;
   marking the third file as non-volatile;
   generating the third hash for the third file based on the third file being marked as non-volatile.

8. A system for performing security scans, the system comprising:
   a generation module programmed to generate a first hash of a first file within a set of files that are subject to security scanning;
   a storing module programmed to:
      perform a first security scan on the first file;
      store the first hash to indicate a result of the first security scan of the first file;
   a determination module programmed to:
      identify a second file within the set of files and generating a second hash of the second file;
      determine that the second hash of the second file is equivalent to the first hash of the first file and, in response, determining that the result of the first security scan of the first file applies to the second file;
   an identification module programmed to identify a third file within the set of files and determining that the third file is volatile and therefore less likely to match another file within the set of files, wherein determining that the third file is volatile comprises:
   identifying a prior hash indicator that indicates that a prior hash for the third file has previously been generated;
   identifying a current hash indicator that indicates that no valid current hash for the third file is available;
   wherein when it is determined that the prior hash indicator indicates that a prior hash has been previously generated and that the current hash indicator indicates that no valid current hash is available, determining that the third file has previously changed;
   a scanning module programmed to perform a second security scan on the third file instead of generating a third hash of the third file in response to determining that the third file is volatile;
   at least one processor configured to execute the generation module, the storing module, the determination module, the identification module, and the scanning module.

9. The system of claim 8, wherein the identification module is programmed to determine that the third file is volatile by determining that the third file has changed since a previous security assessment of the third file.

10. The system of claim 8, wherein the generation module is further programmed to identify the set of files stored across a plurality of virtual machines.

11. The system of claim 8, wherein the generation module is programmed to generate the first hash of the first file in response to determining that the first file is non-volatile.

12. The system of claim 8, wherein the generation module is programmed to generate the first hash of the first file in response to identifying a hash cache and determining that no hash for the first file is available within the hash cache.

13. The system of claim 8, wherein the scanning module is further programmed to:
   identify a digitally-signed file within the set of files;
   perform a security assessment on the digitally-signed file by verifying a digital signature of the digitally-signed file instead of generating an additional hash for the digitally-signed file or performing an additional security scan on the digitally-signed file.

14. The system of claim 8, wherein the generation module is further programmed to:

determine that the third file has not changed over a predetermined period of time;

mark the third file as non-volatile;

generate the third hash for the third file based on the third file being marked as non-volatile.

15. A non-transitory computer-readable medium comprising one or more computer-executable instructions that, when executed by at least one processor of a computing device, cause the computing device to:

generate a first hash of a first file within a set of files that are subject to security scanning;

perform a first security scan on the first file;

store the first hash to indicate a result of the first security scan of the first file;

identify a second file within the set of files and generating a second hash of the second file;

determine that the second hash of the second file is equivalent to the first hash of the first file and, in response, determining that the result of the first security scan of the first file applies to the second file;

identify a third file within the set of files and determining that the third file is volatile and therefore less likely to match another file within the set of files, wherein determining that the third file is volatile comprises:

identifying a prior hash indicator that indicates that a prior hash for the third file has previously been generated;

identifying a current hash indicator that indicates that no valid current hash for the third file is available;

wherein when it is determined that the prior hash indicator indicates that a prior hash has been previously generated and that the current hash indicator indicates that no valid current hash is available, determining that the third file has previously changed;

perform a second security scan on the third file instead of generating a third hash of the third file in response to determining that the third file is volatile.

16. The non-transitory computer-readable medium of claim 15, wherein the one or more computer-executable instructions cause the computing device to determine that the third file is volatile by causing the computing device to determine that the third file has changed since a previous security assessment of the third file.

17. The non-transitory computer-readable medium of claim 15, wherein the one or more computer-executable instructions further cause the computing device to identify the set of files stored across a plurality of virtual machines.

* * * * *